United States Patent Office 3,639,657
Patented Feb. 1, 1972

---

3,639,657
PRODUCTS OF ACID ANHYDRIDES AND POLY-AMINES USED AS LATENT HARDENERS FOR EPOXY RESINS
Raymond Michael Moran, Jr., Bricktown, and Henry Thomas Belekicki, Convent Station, N.J., assignors to Ciba-Geigy Corporation
No Drawing. Continuation-in-part of abandoned application Ser. No. 547,442, May 4, 1966. This application Mar. 19, 1969, Ser. No. 808,698
Int. Cl. C08g 30/14
U.S. Cl. 260—47 EN        6 Claims

ABSTRACT OF THE DISCLOSURE

The reaction products of approximately equimolecular proportions of an acid anhydride, such as phthalic anhydride, and a polyamine, such as diethylenetriamine, are latent hardeners for epoxy resins having more than one 1,2-epoxy groups per molecule and, when combined with an epoxy resin, provide systems which are stable for long periods when stored at ambient or moderately elevated temperatures while providing on curing for relatively short periods at elevated temperatures, on the order of 100–150° C., hardened products of good properties.

---

This application is a continuation-in-part of application Ser. No. 547,442, filed May 4, 1966, now abandoned.

BACKGROUND OF THE INVENTION

Amines and amine derivatives are extensively used as curing agents for epoxy resins. In such use, the amine compounds are combined with the epoxy resins by procedures well-known to the epoxy resin technology. The combinations thus prepared can be cured without further addition of hardening agents.

However, in many instances it is desirable to provide a composition which is readily curable but which has sufficient shelf stability to permit admixture prior to use. It is, therefore, essential that the components, that is, the epoxy resin and the curing agent, be able to coexist for reasonable periods after admixture.

Many of the known curing agents which would provide effective and rapid curing at elevated temperatures are unsatisfactory since they fail to meet this requirement and tend to initiate gelation when incorporated into the epoxy resin.

To provide a solution to this problem, considerable effort has been expended on the development of latent curing agents, that is curing agents which will be unreactive with epoxy resins at about room temperature, but which will react rapidly therewith at elevated temperatures. The provision of such latent curing agents will enable the achievement of epoxy resin compositions which will have a long shelf life, coupled with the capacity for rapid curing on heating.

SUMMARY OF THE INVENTION

In accordance with the present inventions, it has been found that the reaction products of certain anhydrides with certain amines are latent hardeners of desirable characteristics which, when combined with epoxy resins, will provide compositions stable for long periods of time when stored at ambient temperatures or at moderately elevated temperatures while still providing, on curing for relatively short periods at elevated temperatures, for example, for 5–10 minutes at 100–150° C., hardened products of satisfactory properties. It is particularly notable that the properties obtained on curing combinations of epoxy resins and the latent hardeners of the present invention, which have been stored for periods of three months or longer, are of the same order as the properties obtained on curing freshly prepared combinations of epoxy resin and latent hardener.

The anhydrides which are employed as reactants in the preparation of the novel latent hardeners of the present invention are phthalic anhydride, hexahydrophthalic anhydride, tetrahydrophthalic anhydride, methyltetrahydrophthalic anhydride, dodecenylsuccinic anhydride and succinic anhydride.

The amines which are employed as reactants in the preparation of the novel latent hardeners of the present invention are the following polyamines: ethylenediamine, diethylenetriamine, triethylenetetramine, 1,6 - diaminohexane, 1,3-diaminopropane, imino-bis(propylamine) and methyl imino-bis(propylamine).

In carrying out the preparation of the novel reaction products of the present invention, it has been found advantageous to conduct the reaction in an excess of the amine reactant. The particular quantity of excess employed can vary from slightly above equimolecular proportions to a very considerable excess. Obviously, however, practical considerations will govern the amount of excess employed since, for example, the upper limit employed will be dictated by the balancing of costs of material against benefits derived.

The reaction product is readily separated from the excess amine at the completion of the reaction by distilling off the remaining amine under reduced pressure.

In carrying out the reaction, it has been found that temperatures of from about 50° C. to about 160° C. can be employed. For optimum results, however, the reactants are heated to about 100° C. and maintained at this temperature during the reaction. The reaction is ordinarily carried out at atmospheric pressure. Reduced pressures can also be employed or, as in Example 2, a combination of pressures can be employed.

In order to achieve the objectives of the present invention, it has been found that the reaction between the amine reactant and the anhydride reactant must be effected in a nonaqueous medium. The most practical procedure has been found to consist in initially heating the amine reactant to the desired temperature and then adding the anhydride incrementally.

The product of the reaction between 1 mol of anhydride and about 1 mol of amine when incorporated into epoxy resin compositions provides curable compositions which are stable for periods of several months at ambient conditions of temperature and pressure and which can thereafter be readily cured at temperatures of as low as about 100° C. The novel hardener of this invention can be readily incorporated into epoxy resin compositions by known mixing techniques familiar to those working in this field.

The cured products obtained upon heating the curable compositions containing the reaction product of the present invention exhibit very good properties. The epoxy resin component of the curable composition is an epoxide compound containing $n$ epoxide groups per molecule calculated on the average molecular weight of the compound, where $n$ is greater than 1.

As epoxide compounds there may be used esters, such as are obtainable by the reaction of a di- or polybasic carboxylic acid with epichlorohydrin or dichlorohydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid, and especially, aromatic dicarboxylic acids, such as phthalic acid, isophthalic acid, terephthalic acid, 2:6-naphthalene-dicarboxylic acid, diphenyl-ortho:ortho'-dicarboxylic acid, ethylene glycol bis-(para-carboxy-phenyl)ether or the like. Others which may be used are, for example, diglycidyl adipate and diglycidyl phthalate, and also diglycidyl esters which correspond to the average formula:

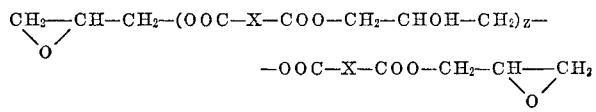

in which X represents an aromatic hydrocarbon radical, such as a phenylene group, and Z represents a small whole number or a small fractional number.

There may also be employed the polyglycidyl ethers, such as are obtainable by the interaction of a dihydric or polyhydric alcohol or a diphenol or polyphenol with epichlorohydrin or related substances, for example, glycerol dichlorohydrin, under alkaline conditions or alternatively in the presence of an acidic catalyst with subsequent alkaline treatment. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols, such as pyrocatechol, hydroquinone, 1:4-dioxynaphthalene, 1:5-dioxynaphthalene, phenol-formaldehyde condensation products, cresolformaldehyde condensation products, bis-(4-hydroxyphenyl)-methane, bis-(4-hydroxyphenyl)-methyl-phenyl-methane, bis-(4-hydroxyphenyl)-tolylmethane, 4:4' - dioxydiphenyl, bis-(4-hydroxyphenyl)sulphone and (for preference) 2:2-bis-(4-hydroxyphenyl)propane. There may also be employed ethylene glycol diglycidyl ether and also diglycidyl ethers which correspond to the average formula:

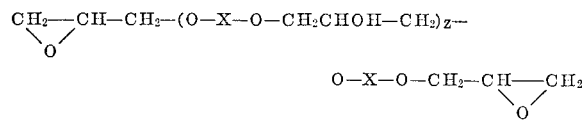

in which X represents an aromatic radical, and Z represents a small whole number or fractional number.

Especially suitable epoxide resins are those that are liquid at room temperature, for example, those obtained from 4:4' - dihydroxydiphenyl - dimethylmethane (Bisphenol-A), which have an epoxide content of about 3.8 to 5.88 epoxide equivalents per kilogram. Such epoxide resins correspond, for example, to the average formula:

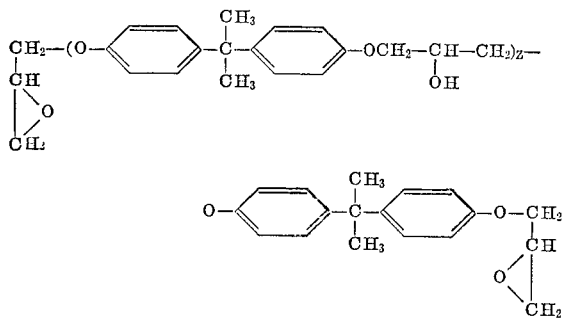

in which Z represents a small number or small fractional number, for example, between 0 and 2.

The ratio of hardener to epoxy resin can vary over a wide range. In general, the proportion of hardener to epoxy resin will range from about 5 parts of hardener to 100 parts of resin to about 75 parts of hardener to about 100 parts of resin. In the case of an epoxy resin having an epoxy value of about 0.53 eq./100 gms., optimum results are realized at proportion of about 35 parts of hardener to about 100 parts of resin.

The following examples will serve to illustrate the invention. The parts referred to are parts by weight.

EXAMPLE 1

Preparation of epoxy resin 520 parts of 2,2-bis(4-hydroxyphenyl) propane and 1300 parts of epichlorohydrin and 25 parts of water are heated to 60° C. with agitation and 180 parts of flaked sodium hydroxide are added in several increments and the temperature maintained at 60° C. for 30 minutes following the addition of the final increment. Unreacted epichlorohydrin and water are then removed under vacuum. The reaction mixture is cooled to 90° C. and about 700 parts of water are added. The mixture is agitated for 30 minutes at 90° C., permitted to settle and the brine layer is drawn off. The material is washed with water, vacuum stripped and cooled under vacuum and discharged. An epoxy resin is obtained having a Brookfield viscosity at 23° C. of 13,000 cps. and an epoxy value of 5.3 eq./kg.

EXAMPLE 2

9064 parts of diethylenetriamine are charged to a reaction vessel and heated to 100° C. The source of heat is then removed and a total of 3256 parts of phthalic anhydride are added in 220 part increments at intervals of twenty minutes. The reaction exotherm is held between 96° C. and 106 C. during the additions. When all of the phthalic anhydride has been added, the reaction mixture is brought to a temperature of 100° C. and held at this temperature for two hours. At the end of this period unreacted diethylenetriamine and water equivalent to about 1 mole of water per mole of phthalic anhydride are removed by vacuum distillation under a partial pressure of 20 mm./Hg. The head temperature at the completion of distillation is about 110° C. and the batch temperature is about 160° C. The total weight of distillate received is 6850 parts. The vacuum is then broken and the product discharged into a tray and cooled.

The product is recovered in a yield of 5470 parts, has a softening point of about 104° C. and an amino nitrogen content of about 8.6% by titration with perchloric acid in glacial acetic acid.

Employing-equimolecular proportions of the anhydrides and polyamines set forth in Table I below, products are obtained having the softening points and amino nitrogen content set forth in Table I.

The reaction products from the anhydrides and polyamines of Table I are combined as indicated with the epoxy resin of Example 1 in the indicated parts per 100 parts of resins. Satisfactory cures are effected on heating the compositions to 150° C.

TABLE I

| | Anhydride | Polyamine | Softening point, °C. | Percent amino N. | Phr. |
|---|---|---|---|---|---|
| a | Phthalic | 1,6-diaminohexane | 80 | 4.56 | 45 |
| b | do | Ethylene diamine | 133 | 5.17 | 70 |
| c | do | Imino bis(propylamine) | 86 | 6.79 | 35 |
| d | do | 1,3-diaminopropane | 93 | 5.15 | 55 |
| e | do | Methyl imino bis (propylamine). | 58 | 8.44 | 70 |
| f | do | Triethylene tetramine | 96 | 11.43 | 40 |
| g | Hexahydrophthalic | Diethylene triamine | 178 | 9.81 | 40 |
| h | Tetrahydrophthalic | do | 131 | 8.62 | 70 |
| i | Succinic | do | 63 | 12.21 | 15/15 |
| j | Polyazelaic | do | 101 | 6.82 | 10/50 |

EXAMPLE 3

A combination consisting of 100 parts of the epoxy resin of Example 1 with 35 parts of the reaciton product of Example 2 is prepared on a 3-roll mill at 25° C. The resultant combination is employed to from and test an aluminum to aluminum adhesive bond in accordance with MIL-A-5090D, "Adhesive, Heat Resistant, Air-frame Structural, Metal-to-Metal," curing of the combination being effected by heating for 6½ minutes at 150° C.

Tensile shear strengths of 3200 pounds per square inch at 25° C. and of 1700 pounds per square inch at 82° C. are obtained. The above procedure is repeated on a combination of the epoxy resin of Example 1 and the hardener of Example 2 which has been stored for 3 months at 25° C. The same satisfactory properties are realized.

EXAMPLE 4

A solid epoxy resin prepared from bisphenol A and epichlorohydrin having an epoxy value of 0.20 eq./100 gms. and a melting point of 70° C. and the hardener of Example 2 are employed in the preparation of a molding powder according to the formulation and procedure set forth below.

Formulation:

| Part A | Parts |
| --- | --- |
| Solid epoxy resin described above | 43.85 |
| Glass fiber 1/16 in. milled | 21.75 |
| Novocite No. 325 | 21.74 |
| Montan wax | 0.36 |

| Part B | |
| --- | --- |
| Hardner of Example 2 | 6.15 |
| Glass fiber 1/16 in. milled | 2.65 |
| Novocite No. 325 | 2.65 |
| Montan wax | 0.05 |

The Novocite No. 325 employed in this formulation is a filler comprising 99.5% silica of an average particle size of 9.4 microns, processed from weathered novaculite.

The molding powder is prepared from the formulation by the following procedure:

(a) The ingredients of each of Parts A and B are separately weighed out and mixed;
(b) Each part is then roll milled on a differential speed two roll mill;
(c) Each part is then coarse ground.
(d) Part A and part B are mixed as coarse grinds.
(e) The dry blend of parts A and B is micropulverized to a reduced particle size to less than 10 microns and blended.

The molding powder thus obtained is transfer molded into standard ASTM test specimens under the following conditions:

Mold temperature: 300° F.
Clamp pressure: 25–30 tons
Transfer pressure: 150 p.s.i. gauge
Cycle time: 5 minutes All test specimens are post-cured in a 300° F. oven for 2 hours.

The following properties are observed in the molded product:

Test results

Tensile properties at 25° C.:
  Ultimate strength, p.s.i.: 11,800
  Modulus of elasticity, p.s.i.: $1.45 \times 10^6$
  Percent elongation at failure: 1.20
Flexural properties at 25° C.:
  Flexural strength, p.s.i.: 15,000
  Modulus of elasticity, p.s.i.: $1.03 \times 10^6$
Deflection temperature ° F.: 208

What is claimed is:

1. A product obtained by the reaction of approximately equimolecular proportions of an anhydride selected from the group consisting of phthalic anhydride, hexahydrophthalic anhydride, tetrahydrophthalic anhydride, methyl tetrahydrophthalic anhydride, polyazelaic anhydride, succinic anhydride and dodecenylsuccinic anhydride with polyamine selected from the group consisting of ethylene diamine, diethylene triamine, triethylene tetramine, 1,3-diaminopropane, 1,6-diaminohexane, imino bis(propylamine) and methyl imino bis(propylamine) at a temperature of from about 50° C. to about 160° C. in an non-aqueous medium.

2. A product according to claim 1 wherein the anhydride is phthalic anhydride and the amine is diethylene triamine.

3. A process for hardening epoxy resin compositions consisting of combining an epoxy resin having a 1,2-epoxy equivalency greater than 1 with the condensation product obtained by reacting approximately equimolecular proportions of an anhydride selected from the group consisting of phthalic anhydride, hexahydrophthalic anhydride, tetrahydrophthalic anhydride, methyl tetrahydrophthalic anhydride, polyazelaic anhydride, succinic anhydride and dodecenylsuccinic anhydride with polyamine selected from the group consisting of ethylene diamine, diethylene triamine, triethylene tetramine, 1,3-diaminopropane, 1,6-diaminohexane, imino bis(propylamine) and methyl imino bis(propylamine) at a temperature of from about 50° C. to about 160° C. in an non-aqueous medium, said condensation product being present in an amount of 5–75 parts of condensation product to epoxy resin to cure said composition to an infusible product.

4. A process according to claim 3 wherein the anhydride is phthalic anhydride and the polyamine is diethylene triamine.

5. A product obtained by combining an epoxy resin having a 1,2-epoxy equivalency greater than 1 with the condensation product obtained by reacting approximately equimolecular proportions of an anhydride selected from the group consisting of phthalic anhydride, hexahydrophthalic anhydride, tetrahydrophthalic anhydride, methyl tetrahydrophthalic anhydride, polyazelaic anhydride, succinic anhydride and dodecenylsuccinic anhydride with polyamine selected from the group consisting of ethylene diamine, diethylene triamine, triethylene tetramine, 1,3-diaminopropane, 1,6-diaminohexane, imino bis(propylamine) and methyl imino bis(propylamine) at a temperature of from about 50° C. to about 160° C. in an non-aqueous medium, said condensation product being present in an amount sufficient to cure said composition to an infusible product.

6. A product according to claim 5 wherein the anhydride is phthalic anhydride and the polyamine is diethylene triamine.

References Cited

UNITED STATES PATENTS 2,130,948  9/1938  Carothers _____ 260—78
3,488,742  1/1970  Blekicki et al. ____ 260—47 X

FOREIGN PATENTS 789,108  1/1958  Great Britain _____ 260—830

HAROLD D. ANDERSON, Primary Examiner

T. E. PERTILLA, Assistant Examiner

U.S. Cl. X.R.

117—127 R; 161 ZB; 260—2 N, 59, 75 EP, 326 N, 537